US011121666B2

(12) United States Patent
Magee

(10) Patent No.: US 11,121,666 B2
(45) Date of Patent: Sep. 14, 2021

(54) SOLAR POWERED ELECTRIC GENERATOR

(71) Applicant: Biglyhalls LLC, Port Hueneme, CA (US)

(72) Inventor: Timothy Magee, Port Hueneme, CA (US)

(73) Assignee: Biglyhalls LLC, Port Hueneme, CA (US)

( * ) Notice: Subject to any disclaimer, the term of this patent is extended or adjusted under 35 U.S.C. 154(b) by 171 days.

(21) Appl. No.: 16/551,290

(22) Filed: Aug. 26, 2019

(65) Prior Publication Data

US 2021/0067089 A1    Mar. 4, 2021

(51) Int. Cl.
*H02S 10/40*     (2014.01)
*H02S 40/38*     (2014.01)
*H01M 10/46*     (2006.01)
*H01M 10/44*     (2006.01)
*H02S 10/20*     (2014.01)

(52) U.S. Cl.
CPC ............. *H02S 10/40* (2014.12); *H01M 10/44* (2013.01); *H01M 10/465* (2013.01); *H02S 10/20* (2014.12); *H02S 40/38* (2014.12)

(58) Field of Classification Search
CPC ...................................... H02S 10/40
USPC ......................................... 320/101
See application file for complete search history.

(56) References Cited

U.S. PATENT DOCUMENTS

| | | | |
|---|---|---|---|
| 2007/0019453 A1* | 1/2007 | Pierce | H01M 50/256 363/107 |
| 2009/0039705 A1* | 2/2009 | Lyman | H02S 30/20 307/64 |
| 2010/0315850 A1* | 12/2010 | J'Neva Devi | H02M 7/493 363/95 |
| 2016/0294191 A1* | 10/2016 | Armstrong | H02S 30/20 |
| 2016/0373054 A1* | 12/2016 | Wang | H02S 40/38 |
| 2019/0013766 A1* | 1/2019 | Stach | H02J 7/35 |
| 2019/0036359 A1* | 1/2019 | Smith | H02J 7/35 |
| 2020/0313455 A1* | 10/2020 | Adamany | H02J 7/0042 |

* cited by examiner

*Primary Examiner* — Jerry D Robbins
(74) *Attorney, Agent, or Firm* — Trojan Law Offices

(57) ABSTRACT

The present invention relates to a solar powered electric generator having a housing having at least one vent to allow air to exit from inside of the housing and at least one air intake allow air to enter the housing. The solar powered electric generator includes a cooling fan to blow air out of the at least one vent and a threaded electrical input connector to receive electrical energy from a solar panel array. The solar powered electric generator includes at least one rechargeable battery, at least one electrical output connector, and at least one electrical controller distribute electrical power received from the threaded electrical input connector to the at least one rechargeable battery and the at least one electrical output connector. The solar powered electric generator includes an adjustor that allows a user to adjust the output electrical energy to the at least one electrical output connector.

16 Claims, 10 Drawing Sheets

SOLAR POWERED ELECTRIC GENERATOR

BACKGROUND

1. Field

This specification relates to a solar powered electric generator.

2. Description of the Related Art

Solar powered electric generators are becoming indispensable for individuals and institutions alike for a number of a reasons. First, they provide the ability to generate electrical energy (assuming adequate sunlight) regardless of geographic location or proximity to existing electrical grids. Second, they provide a crucial source of backup electrical energy if the electrical grid goes down. For example, after natural disasters it is common for the electrical grid to go down either as a result of damage or by an intentional shut down for safety reasons.

While major institutions such as hospitals are outfitted with diesel powered emergency backup generators, smaller institutions and individuals largely do not possess smaller scale emergency backup generators because of several inherent drawbacks. These drawbacks include the requirement for regular maintenance, regular fuel cycling, as well as a fresh supply of fuel. With solar powered electric generators, the fuel source (i.e. sunlight) is always available. Moreover, solar powered electric generators do not require regular maintenance.

However, existing solar powered electric generators are not without their own drawbacks. Existing solar powered electric generators generally have issues of overheating. When solar powered electric generators overheat they need to be turned off immediately and allowed to cool to prevent damage to the internal electrical components. Additionally, the electrical input connectors on existing solar powered electric generators wear out relatively quickly as a result of repeated couplings with solar panel arrays. As a result of these repeated couplings, existing electrical input connectors are frequently forced out of the associated housing of the solar powered electric generators. Moreover, existing solar powered electric generators do not have a means to allow a user to adjust the output electrical energy of the solar powered electric generators.

Therefore, there exists a need for a solar powered electric generator without the above-mentioned drawbacks.

SUMMARY

In general, one aspect of the subject matter described in this specification is embodied in a solar powered electric generator. The solar powered electric generator includes a housing having at least one vent configured to allow air to exit from inside of the housing and at least one air intake configured to allow air to enter the housing. The solar powered electric generator includes a cooling fan disposed within the housing and configured to blow air out of the at least one vent. The solar powered electric generator includes a threaded electrical input connector coupled to the housing and configured to receive electrical energy from a solar panel array. The solar powered electric generator includes at least one rechargeable battery disposed within the housing. The solar powered electric generator includes at least one electrical output connector coupled to the housing. The solar powered electric generator includes at least one electrical controller disposed within the housing and configured to distribute electrical power received from the threaded electrical input connector to the at least one rechargeable battery and the at least one electrical output connector. The solar powered electric generator includes an adjustor coupled to the housing and in electrical communication with the at least one electrical controller, the adjustor being configured to allow a user to adjust the output electrical energy to the at least one electrical output connector.

These and other embodiments may include one or more of the following features. The at least one electrical output connector may include at least one of a 12-volt electrical connector, a USB connector, an Anderson Powerpole connector, or a JST connector. The solar powered electric generator may include a positive electrical terminal coupled to the housing and in electrical communication with the at least one rechargeable battery and a negative electrical terminal coupled to the housing and in electrical communication with the at least one rechargeable battery. The solar powered electric generator may include at least one input electrical gauge coupled to the housing and comprising at least one of a voltmeter or an ammeter and at least one output electrical gauge coupled to the housing and comprising at least one of voltmeter or an ammeter. The adjustor may be a potentiometer.

The solar powered electric generator may include one or more carrying handles coupled the housing. The one or more carrying handles may include one or more air inlet apertures in fluidic communication with the at least one air intake.

The solar powered electric generator may include a wireless access device in electrical communication with the at least one electrical controller and configured to communicated with and receive commands from a mobile device. The mobile device may be at least one of a remote control, a smartphone, or a tablet.

One aspect of the subject matter described in this specification is embodied in a solar powered electric generator system. The solar powered electric generator system includes a solar panel array having an electrical power transmission line with a threaded electrical output connector, the solar panel array being configured to generate electrical energy. The solar powered electric generator system includes a solar powered electric generator. The solar powered electric generator includes a housing having at least one vent configured to allow air to exit from inside of the housing and at least one air intake configured to allow air to enter the housing. The solar powered electric generator includes a cooling fan disposed within the housing and configured to blow air out of the at least one vent. The solar powered electric generator includes a threaded electrical input connector coupled to the housing and configured to receive electrical energy from a solar panel array. The solar powered electric generator includes at least one rechargeable battery disposed within the housing. The solar powered electric generator includes at least one electrical output connector coupled to the housing. The solar powered electric generator includes at least one electrical controller disposed within the housing and configured to distribute electrical power received from the threaded electrical input connector to the at least one rechargeable battery and the at least one electrical output connector. The solar powered electric generator includes an adjustor coupled to the housing and in electrical communication with the at least one electrical controller, the adjustor being configured to allow a user to adjust the output electrical energy to the at least one electrical output connector.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

In the following detailed description, numerous specific details are set forth to provide an understanding of the present disclosure. It will be apparent however, to one of ordinary skill in the art that elements of the present disclosure may be practiced without some of these specific details. In other instances, well-known structures and techniques have not been shown in detail to avoid unnecessarily obscuring the present disclosure.

Figure 1:
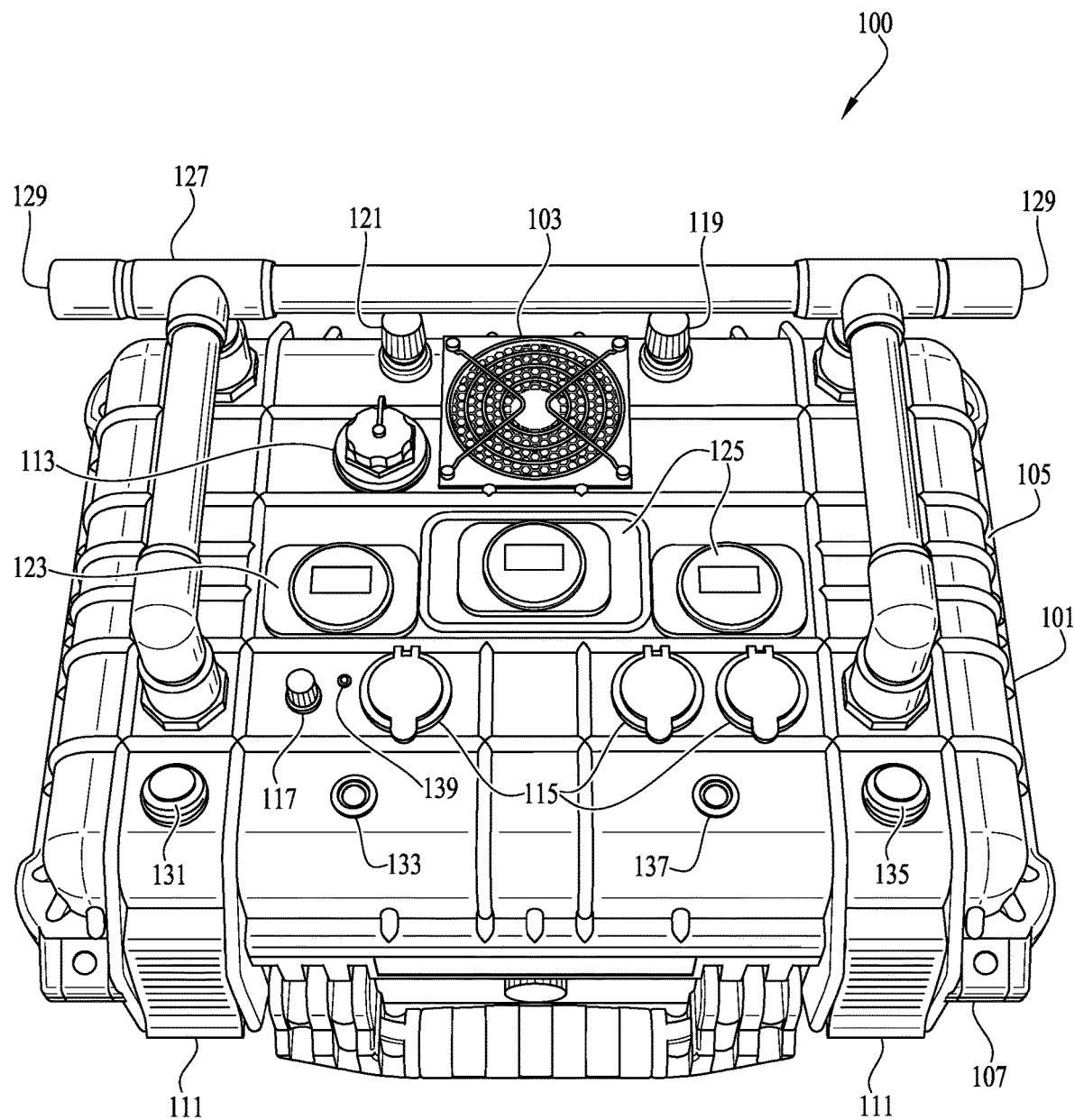
FIG. 1 shows a top view of a solar electric generator according to an aspect of the invention.

FIG. 1 illustrates a solar powered electric generator 100 according to an embodiment of the invention. The solar powered electrical generator 100 includes a housing 101. The housing 101 has a top surface, a bottom surface opposite the top surface, and a plurality of side surfaces extending between the top surface and the bottom surface. The housing 101 includes at least one vent 103 that allows air to exit from inside of the housing 101. As depicted in FIG. 1, the housing 101 has one vent 103 located on the top surface of the housing 101. However, any number of vents may be used according to various embodiments. Additionally, the at least one vent 103 may be located on any surface of the housing 101. For example, the at least one vent 103 may be located on any of the plurality of side surfaces. The housing 101 includes at least one air intake 145 (shown in FIG. 8) that allows air to enter the housing 101.

The housing 101 includes a first section 105 and a second section 107 coupled to the first section 105. As depicted in FIG. 1, the top surface of the housing 101 is located on the first section 107 of the housing 101. The bottom and the plurality of side surfaces of the housing 101 are located on the second section 109 of the housing 101. The first section 105 and the second section 107 are coupled together via one or more hinges 109 (shown in FIG. 6) to allow a user to open up and access the inside of the housing 101 by unlocking one or more latches 111. The one or more hinges 109 are on the opposite side of the housing 101 from the one or more latches 111. In some embodiments, the one or more hinges 109 may be substituted by additional one or more latches that allow the first section 105 to be removably coupled from the second section 107. The one or more latches 111 may be replaced by other forms of locking mechanisms interchangeably according to various embodiments. For example, the one or more latches 111 may be replaced by one or more magnetic closure devices.

The housing 101 is depicted as being rectangular in shape. However, other shapes may be used interchangeably according to various embodiments. For example, the housing 101 may be square or circular in shape. The housing 101 may be constructed from a high impact plastic. In some embodiments, the housing 101 may be constructed from metal. For example, the housing 101 may be constructed from aluminum.

The solar electric generator 100 includes a threaded electrical input connector 113 coupled to the housing 101 and receives electrical energy from a solar panel array. As depicted, the threaded electrical input connector 113 is coupled to the top surface of the housing 101. However, the threaded electrical input connector 113 may be coupled to other surfaces of the housing 101 interchangeably according to various embodiments. For example, the threaded electrical input connector 113 may be coupled to one of the plurality of side faces of the housing 101. The threaded electrical input connector 113 may include a cap that helps seal the threaded electrical input connector 113 from the environment (e.g. moisture and dust). The threaded electrical input connector 113 allows for removable coupling to an output connector of the solar panel array without the drawbacks associated with other connector configurations (e.g. "push in" type connectors). Those drawbacks include the connector being forced out of the housing 101 by repeated couplings. The threaded electrical input connector 113 may inherently avoid or at least mitigate this type of wear.

The solar panel array includes an electrical power transmission line with a threaded electrical output connector that is removeably coupled to the threaded electrical input connector 113 of the solar electric generator 100. The solar panel array generates electrical energy by converting sunlight into energy. The electrical power transmission line may include an integrated circuit breaker. In some embodiments the integrated circuit breaker may be electrically coupled between two electrical power transmission lines. For example, the solar panel array may be coupled to a first electrical power transmission line, the first electrical power transmission line may be coupled an integrated circuit breaker which is also coupled to a second electrical power transmission line having a threaded electrical output connector.

The solar electric generator 100 includes at least one rechargeable battery 139 (shown in FIG. 7) disposed within the housing 101. As depicted, the at least one rechargeable battery 139 is disposed within the second section 107 of the housing 101. In some embodiments, the at least one rechargeable battery 139 may be a Lithium-ion (Li-ion) type. However, other types of rechargeable batteries may be used interchangeably according to various embodiments. For example, the battery may be any one of a Nickel Cadmium (Ni—Cd), Nickel-Metal Hydride (Ni-MH), or Lead-Acid types. In other embodiments, the at least one rechargeable battery 139 may be one or more capacitors. In some embodiments, the solar electric generator 100 may be serially connected to other solar electric generators.

The solar electric generator 100 includes at least one electrical output connector 115 coupled to housing 101. As depicted in FIG. 1, the at least one electrical output connector 115 is coupled to the top surface of the housing. However, the at least one electrical output connector 115 may be coupled to other surfaces of the housing 101 interchangeably according to various embodiments. For example, the at least one electrical output connector 115 may be coupled to one of the plurality of side faces of the housing 101. As shown in FIG. 1, the at least one electrical output connector 115 includes three (3) electrical output connectors. The three electrical output connectors are a 12-volt electrical connector, a USB connector, and an Anderson Powerpole connector. However, other electrical output connector types may be used interchangeably according to various embodiments. For example, a JST connector may be used. The at least one electrical output connector 115 may include one or more caps or covers that help seal the at least one electrical output connector 115 from the environment (e.g. moisture and dust).

The solar electric generator 100 includes at least one electrical controller 143 (shown in FIG. 8) disposed within the housing 101. As depicted, the at least one electrical controller 143 is disposed within the first section 105 of the housing 101. The at least one electrical controller 143 distributes electrical power received from the threaded electrical input connector 113 to the at least one rechargeable battery 139 and the at least one electrical output connector 115. In some embodiments, the solar electric generator 100 may include a first power button 131 for the at least one electrical controller 143. The first power button 131 may allow a user to turn on the at least one electrical controller 143 to begin either storing electrical energy received from the solar panel array in the at least one rechargeable battery 139 and/or facilitate electrical energy being sent to the at least one electrical output connector 115.

In some embodiments, the solar electric generator 139 may include as second power button 135 for the at least one electrical controller 143. The second power button 135 may allow a user to facilitate electrical energy being sent to the at least one electrical output connector 115.

The solar electric generator 100 includes an adjustor 117 coupled to the housing 101. As depicted in FIG. 1, the adjustor 117 is coupled to the top surface of the housing 101. However, the adjustor 117 may be coupled to other surfaces of the housing 101 interchangeably according to various embodiments. For example, the adjustor 117 may be coupled to one of the plurality of side faces of the housing 101. The adjustor 117 is in electrical communication with the at least one electrical controller 143 and allows a user to adjust the output electrical energy to the at least one electrical output connector 115. In some embodiments, the adjustor 117 may be a potentiometer. However, other devices that can adjust the output electrical energy may be used interchangeably according to various embodiments. The adjustor 117 may allow a user to match the output electrical energy to the electrical energy received from a solar panel array so as not use the stored electrical energy in the at least one rechargeable battery 139. This helps ensure that the at least one rechargeable battery 139 remains fully charged. The adjustor 117 may similarly allow a user to reduce the output electrical energy so as less electrical energy is leaving the solar electric generator 100 than is received from a solar panel array. This may allow for other devices to be powered via the at least one electrical output connector 115 while also allowing the at least one rechargeable battery 139 be charged.

The solar electric generator 100 includes a cooling fan 141 (shown in FIG. 8) disposed within the housing 101. As depicted, the cooling fan 141 is disposed within the first section 105 of the housing 101. The cooling fan 141 blows air out of the at least one vent 103. In some embodiments, the cooling fan 141 sucks in cooler air from the at least one air intake 145, circulates the air within the housing 101 and blows the heated air out of the at least one vent 103. In some embodiments, the solar electric generator 100 may include a fan power button 133 for the cooling fan 141. The fan power button 133 may allow a user to selectively cool the solar electric generator 100 and turn off the cooling fan 141 when cooling is no longer needed. The solar electric generator 100 may further include an indicator light 139 that indicates when the cooling fan 141 is turned on.

The solar electric generator 100 may include a positive electric terminal 119 coupled to the housing 101. As depicted, the positive electric terminal 119 is coupled to the top surface of the housing 101. However, the positive electric terminal 119 may be coupled to other surfaces of the housing 101 interchangeably according to various embodiments. For example, the positive electric terminal 119 may be coupled to the one of the plurality of side faces of the housing 101. The positive electric terminal 119 may be in electrical communication with the at least one rechargeable battery 139. In some embodiments, the positive electric terminal 119 may be in electrical communication with the at least one electrical controller 143. The positive electric terminal 119 may include a cap that helps seal the positive electric terminal 119 from the environment (e.g. moisture and dust).

The solar electric generator 100 may include a negative electric terminal 121 coupled to the housing 101. As depicted, the negative electric terminal 121 is coupled to the top surface of the housing 101. However, the negative electric terminal 121 may be coupled to other surfaces of the housing 101 interchangeably according to various embodiments. For example, the negative electric terminal 121 may be coupled to the one of the plurality of side faces of the housing 101. The negative electric terminal 121 may be in electrical communication with the at least one rechargeable battery 139. In some embodiments, the negative electric terminal 121 may be in electrical communication with the at least one electrical controller 143. The negative electric terminal 121 may include a cap that helps seal the negative electric terminal 121 from the environment (e.g. moisture and dust).

The solar electric generator 100 may include at least one input electrical gauge 123 coupled to the housing 101. As depicted, the at least one input electrical gauge 123 is coupled to the top surface of the housing 101. However, the at least one input electrical gauge 123 may be coupled to other surfaces of the housing 101 interchangeably according to various embodiments. For example, the at least one input electrical gauge 123 may be coupled to the one of the plurality of side faces of the housing 101. The at least one input electrical gauge 123 is at least one of a voltmeter or an ammeter. As depicted, the at least one input electrical gauge 123 is an ammeter. The at least one input electrical gauge 123 indicates how much electrical energy is being received from the solar panel array.

The solar electric generator 100 may include at least one output electrical gauge 125 coupled to the housing 101. As depicted, the at least one output electrical gauge 125 is coupled to the top surface of the housing 101. However, the at least one output electrical gauge 125 may be coupled to other surfaces of the housing 101 interchangeably according to various embodiments. For example, the at least one output electrical gauge 125 may be coupled to the one of the plurality of side faces of the housing 101. The at least one output electrical gauge 125 at least one of a voltmeter or an ammeter. As depicted, the at least one output electrical gauge 125 includes both a voltmeter and an ammeter. The at least one output electrical gauge 125 indicates how much electrical energy is being delivered from the solar electric generator 100. In some embodiments, the solar electric generator 100 may include an output gauge power button 137. The output gauge power button 137 may allow a user to measure the electrical energy being delivered from the solar electric generator 100.

The solar electric generator 100 may include one or more carrying handles 127 coupled to the housing 101. As depicted, the one or more carrying handles 127 is coupled to the top surface of the housing 101. However, the one or more carrying handles 127 may be coupled to other surfaces of the housing 101 interchangeably according to various embodiments. For example, the one or more carrying handles 127 may be coupled to the one of the plurality of side faces of the housing 101. The one or more carrying handles 127 may include one or more air inlet apertures 129 (shown in FIG. 2) in fluidic communication with the at least one air intake 145. The one or more air inlet apertures 129 may allow for air to enter the housing 101. To facilitate air entering into the housing 101, the one or more carrying handles 127 may be of hollow construction or have air channels leading from the one or more air inlet apertures 129 to the at least one air intake 145. In some embodiments, the cooling fan 141 sucks in cooler air from the one or more air inlet apertures 129, the cooler air passes through the at least one air intake 145, the air is circulated within the housing 101, and the cooling fan 141 blows the now heated air out of the at least one vent 103.

The location of the one or more air inlet apertures 129 on the one or more carrying handles 127 may be chosen to help mitigate against hotter air blown from the at least one vent 103 from entering back into the housing 101. As depicted, the location of the one or more air inlet apertures 129 lies on a different vector than the at least one vent 103 and is spaced away from the at least one vent 103 to help mitigate against the hotter air from reentering the housing 101. The one or more carrying handles 127 may have mesh screens placed over the one or more air inlet apertures 129 to help mitigate against the entry of particulate matter into the housing 101. In some embodiments, the one or more carrying handles 127 may include internal air filters to help mitigate against the entry of particulate matter into the housing 101. The internal air filters may be located adjacent to or within the one or more air inlet apertures 129. In other embodiments, the internal air filters may be located adjacent to or within the at least one air intake.

The solar electric generator 100 may include a wireless access device in electrical communication with the at least one electrical controller 143. The wireless access device may communicate with and receive commands from a mobile device. The wireless access device may include a communication port or channel, such as one or more of a Wi-Fi unit, a Bluetooth® unit, a radio frequency identification (RFID) tag or reader, an infrared sensor, or a cellular network unit for accessing a cellular network (such as a 3G or 4G). In some embodiments, the mobile device may be at least one of a remote control, a smartphone, or a tablet.

The components of the solar electric generator 100, as discussed in FIG. 1, may be selected based on their inherent low temperature of operation. This may assist in ensuring that the solar electric generator 100 does not overheat, thus increasing the life expectancy of the various components of the solar electric generator 100 and the solar electric generator 100 as a unit.

Figure 2:
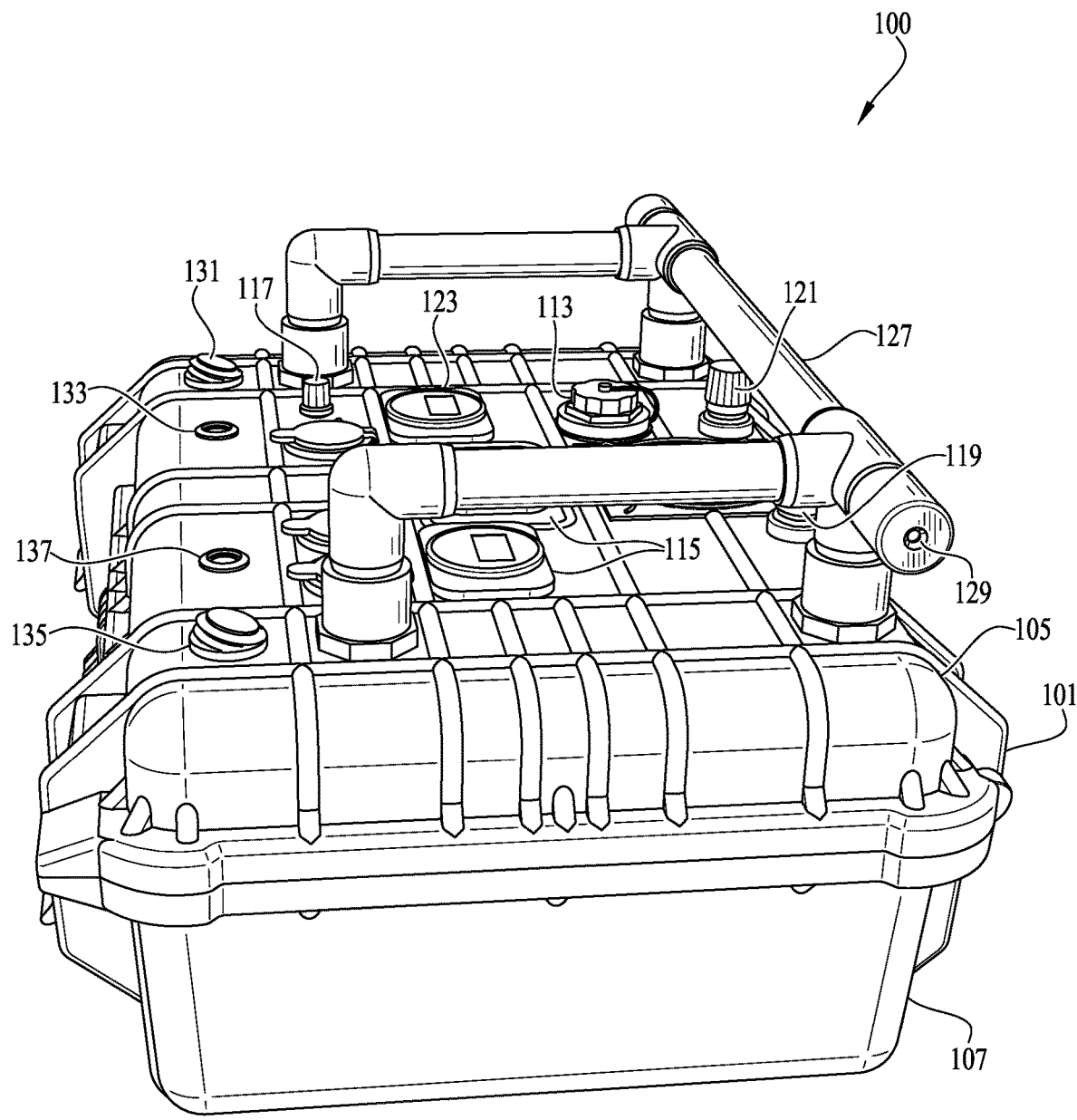
FIG. 2 shows a side perspective view of the solar electric generator from FIG. 1 according to an aspect of the invention.

FIG. 2 shows a side perspective view of the solar electric generator 100 according to an aspect of the invention. As shown, the one or more carrying handles 127 include one or more air inlet apertures 129 in fluidic communication with the at least one air intake 145.

Figure 3:
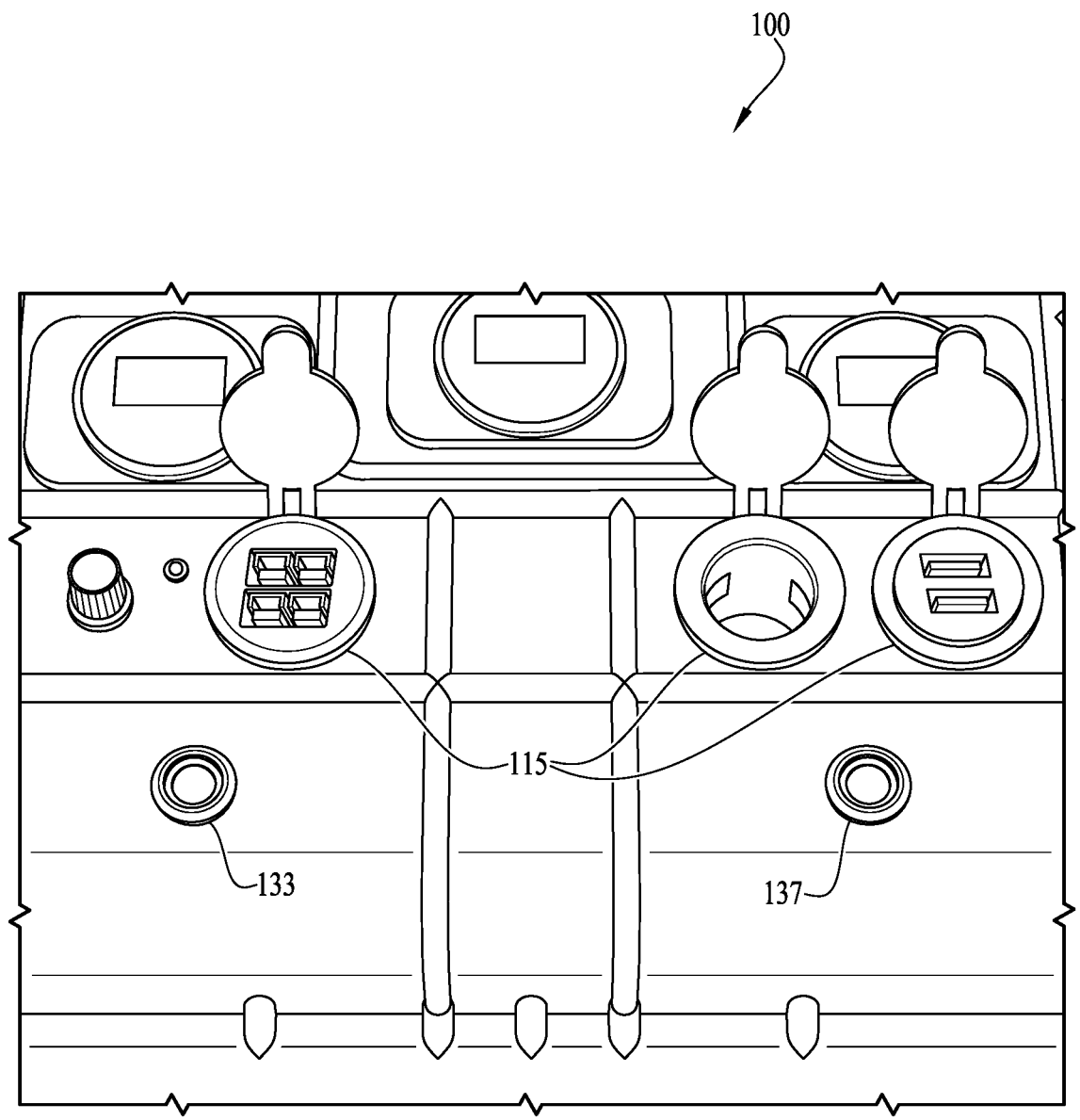
FIG. 3 shows a close up view of the solar electric generator from FIG. 1 according to an aspect of the invention.

FIG. 3 shows a close up view of the solar electric generator 100 from FIG. 1 according to an aspect of the invention. As shown, the covers for the at least one electrical output connector 115 have been lifted up to show the ports.

Figure 4:
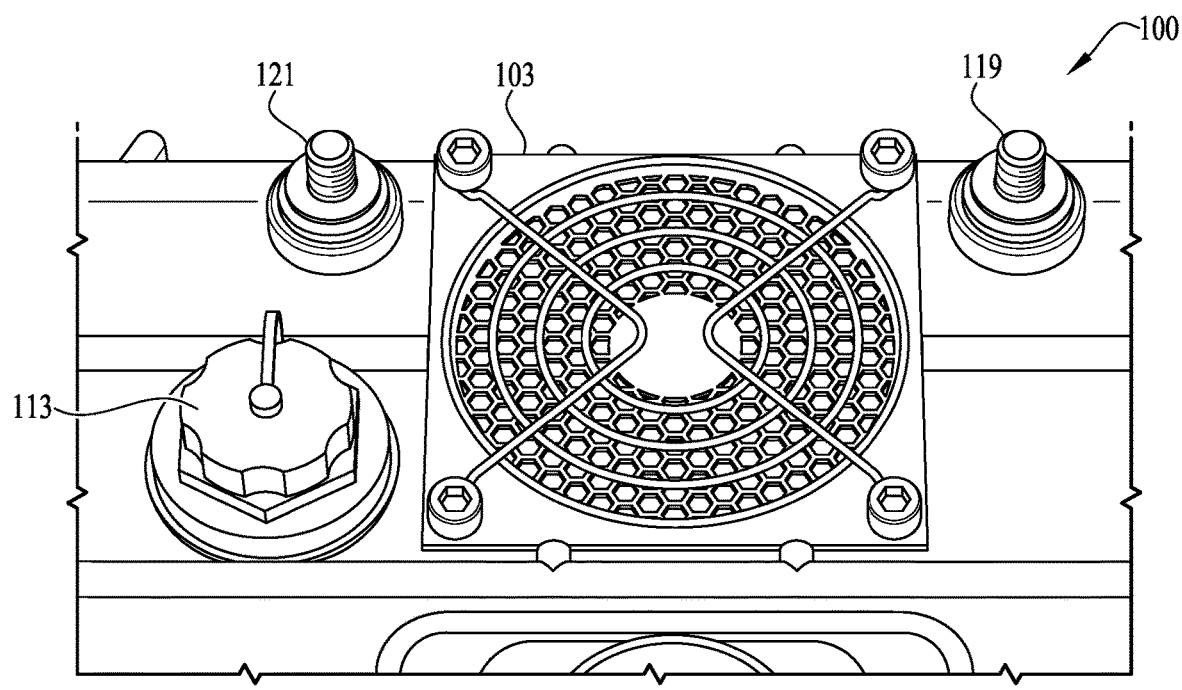
FIG. 4 shows a close up view of the solar electric generator from FIG. 1 according to an aspect of the invention.

FIG. 4 shows a close up view of the solar electric generator 100 from FIG. 1 according to an aspect of the invention. As shown, the caps for the positive electric terminal 119 and the negative electric terminal 121 have been removed to show the associated connectors.

Figure 5:
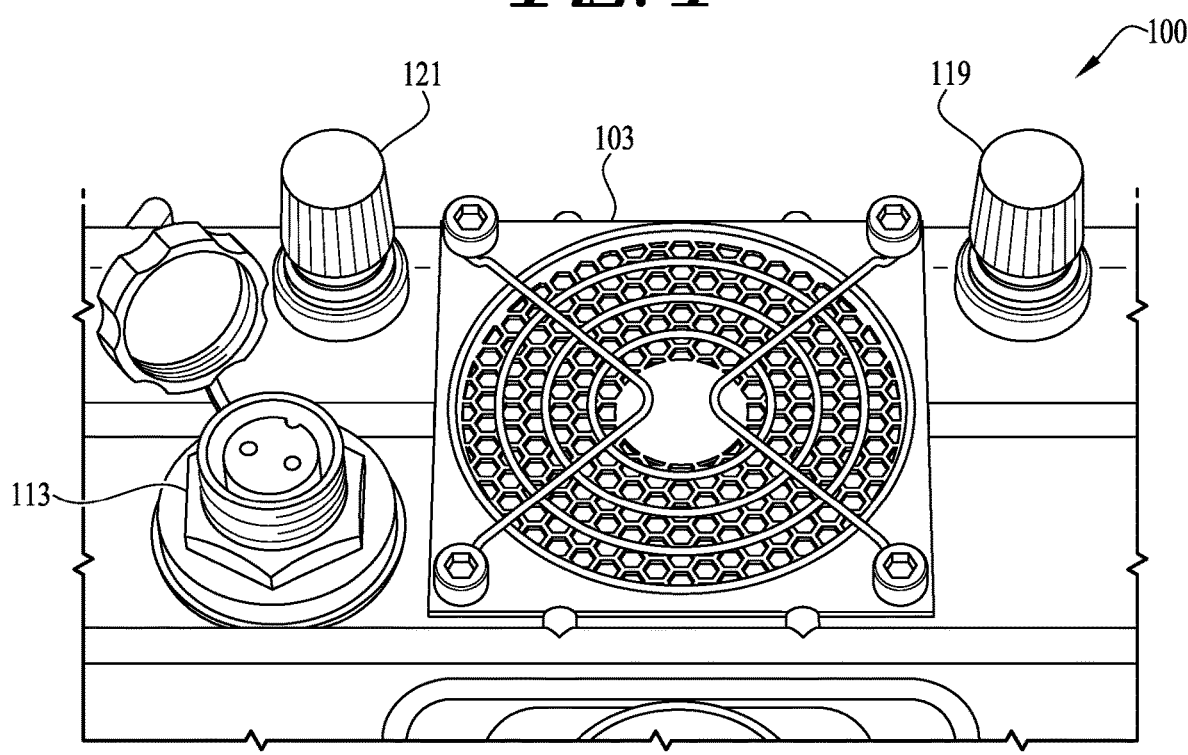
FIG. 5 shows a close up view of the solar electric generator from FIG. 1 according to an aspect of the invention.

FIG. 5 shows a close up view of the solar electric generator 100 from FIG. 1 according to an aspect of the invention. As shown, the cap for the threaded electrical input connector 113 has been decoupled from the threaded electrical input connector 113 to show the input port.

Figure 6:
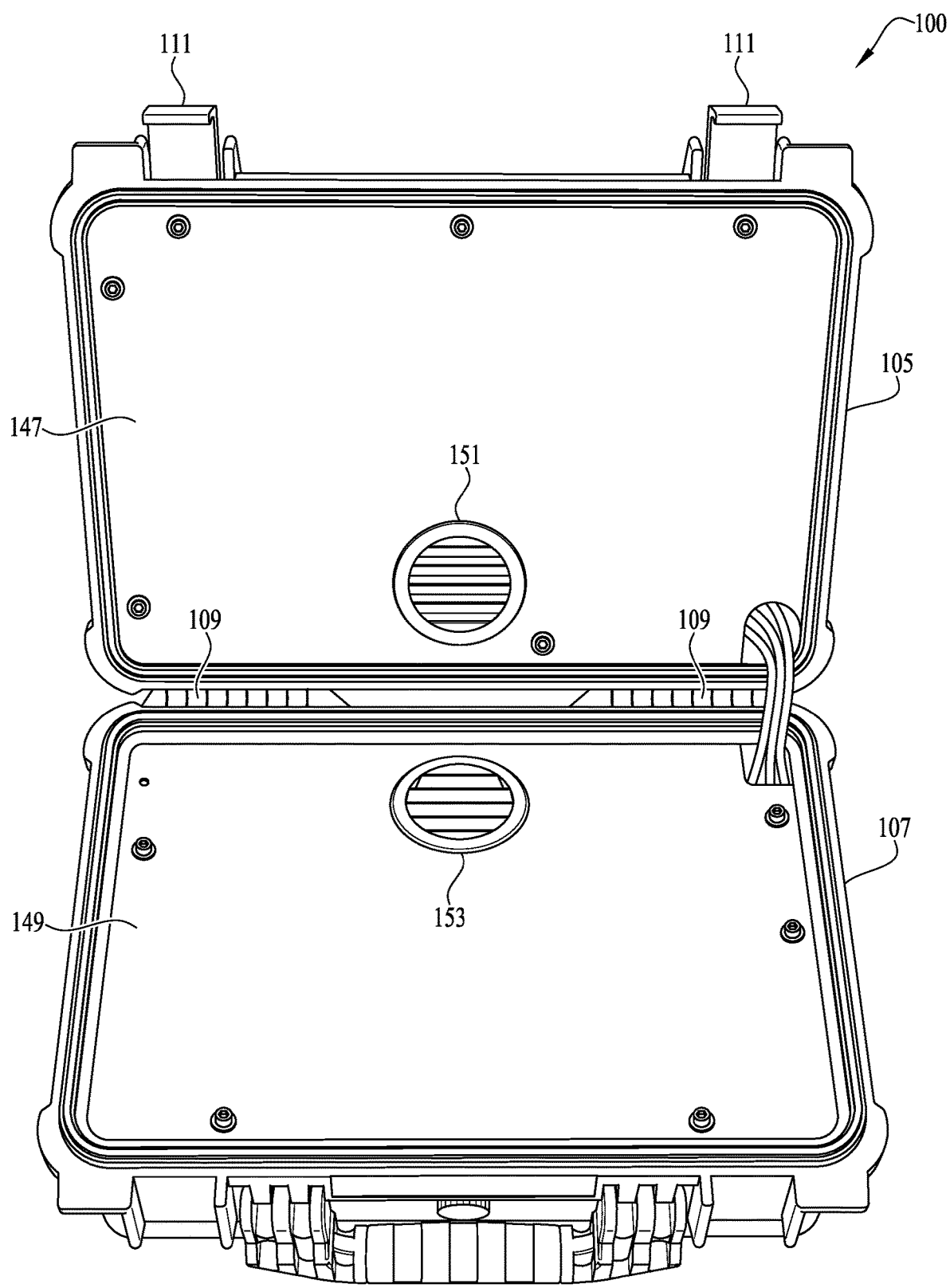
FIG. 6 shows an opened view of the solar electric generator from FIG. 1 according to an aspect of the invention.

FIG. 6 shows an opened view of the solar electric generator 100 from FIG. 1 according to an aspect of the invention. As shown, the one or more latches 111 have been unlocked and the first section 105 of the housing 101 is decoupled from the second section 107 of the housing 109. The first section 105 pivoting relative to the second section 107 via the one or more hinges 109.

The first section 105 includes a first panel 147 that covers the electronics contained within the first section 105. The second section 107 includes a second panel 149 that covers the electronics contained within the second section 107. The first panel 147 includes a first panel vent 151 that, when the first section 105 is coupled to the second section 107, allows air to be circulated from the first section 105 to the second section via the second panel vent 153 on the second panel 149. Similarly, the second panel vent 153, when the first section 105 is coupled to the second section 107, allows air to flow from the second section 107 to the first section 105 via the first panel vent 151 on the first panel 147.

Figure 7:
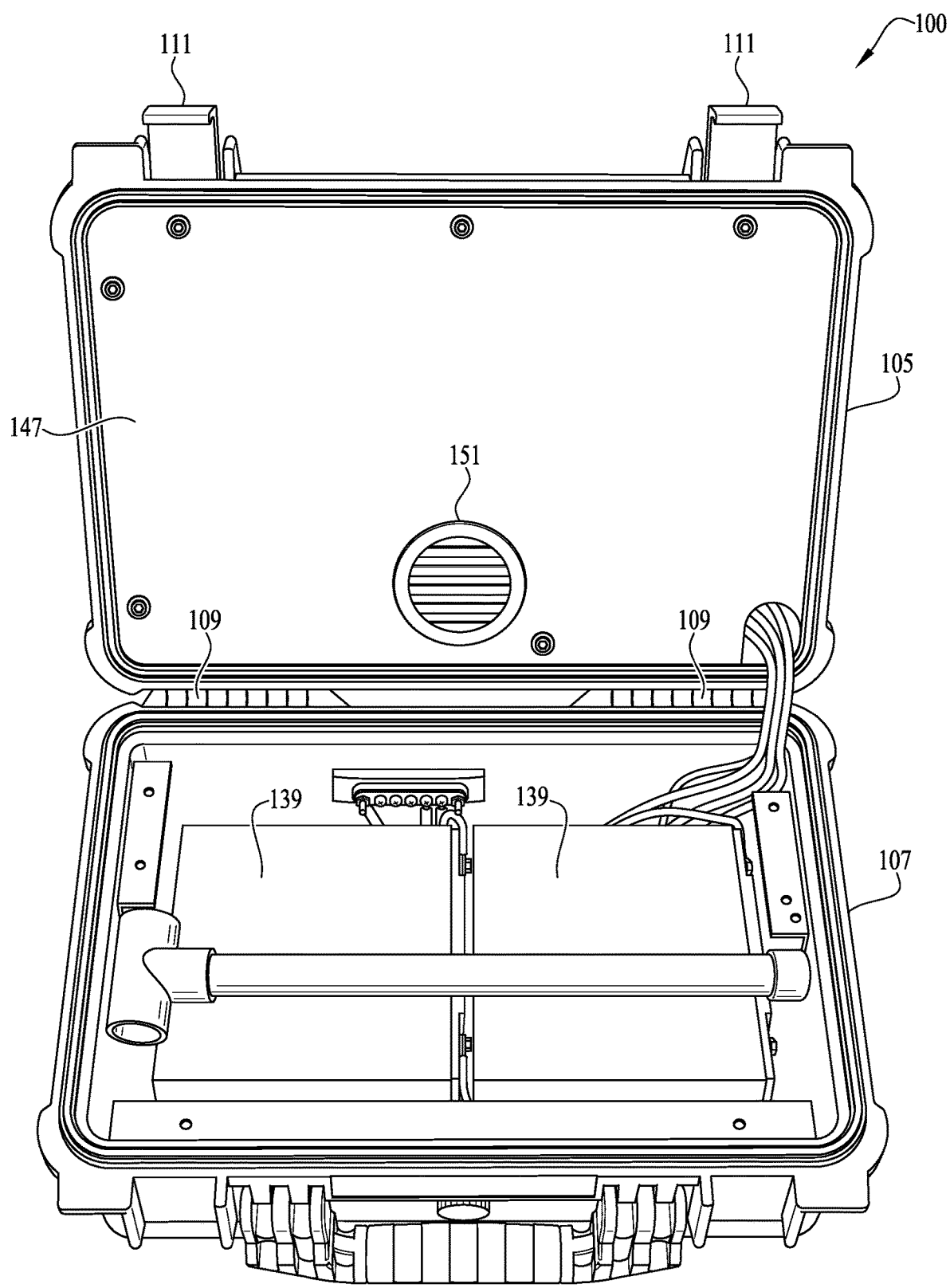
FIG. 7 shows an internal view of the second section of the solar electric generator from FIG. 1 according to an aspect of the invention.

FIG. 7 shows an internal view of the second section 107 of the solar electric generator 100 from FIG. 1 with the second panel 149 removed according to an aspect of the invention. As shown, the solar electric generator 100 includes at least one rechargeable battery 139 disposed within the housing 101. As depicted, the at least one rechargeable battery 139 are disposed within the second section 107 of the housing 101. In other embodiments, the at least one rechargeable battery 139 may be disposed within the first section 105 of the housing 101.

The second section 107 may include various tie downs, harness, or couplings to securely couple the at least one rechargeable battery 139 to the housing 101. As shown, the at least one rechargeable battery 139 has various electrical wires and connectors connecting the at least one rechargeable battery 139 to the associated components located in the first section 105 of the housing 101.

Figure 8:
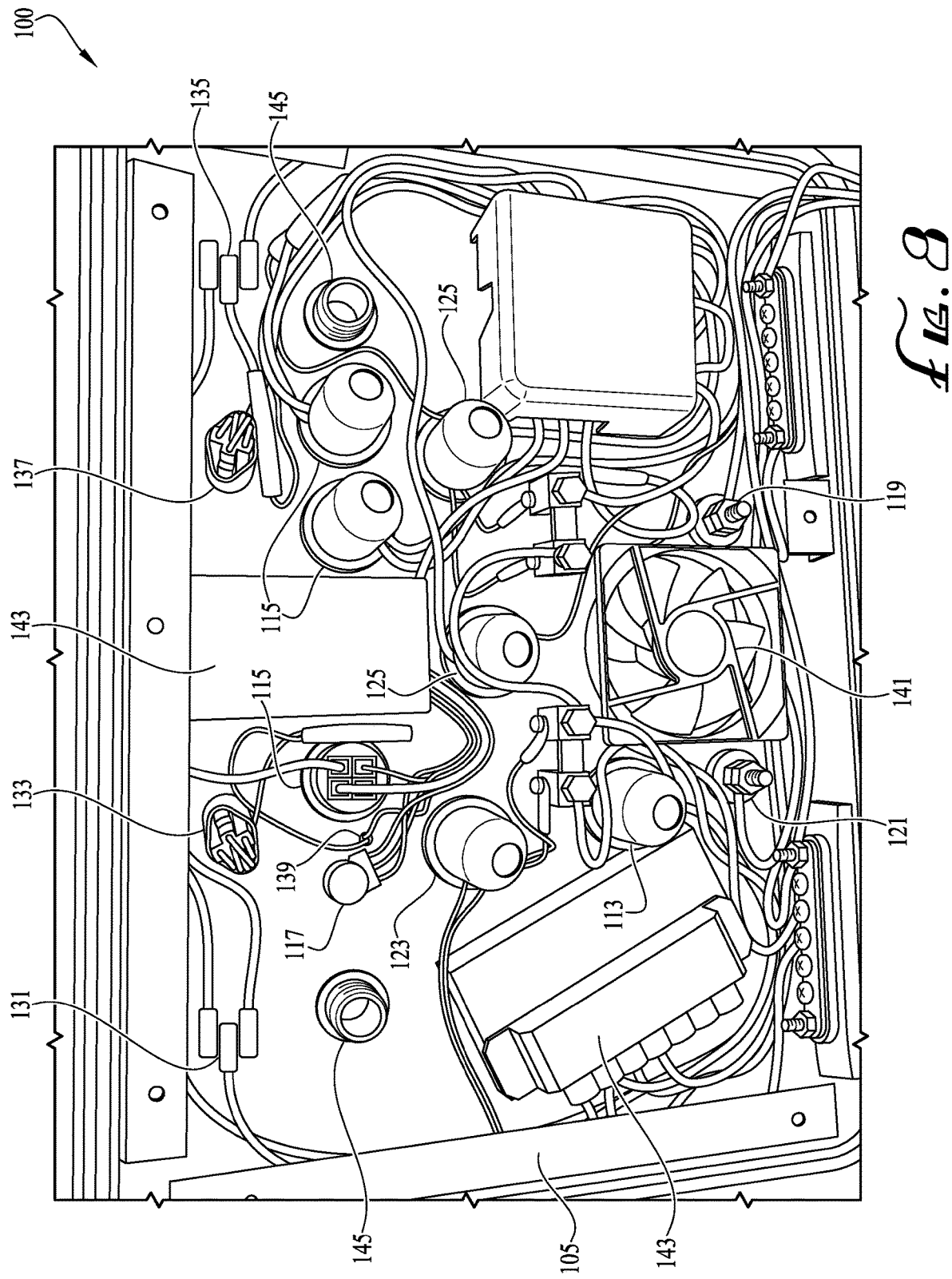
FIG. 8 shows an internal view of the first section of the solar electric generator from FIG. 1 according to an aspect of the invention.

FIG. 8 shows an internal view of the first section 105 of the solar electric generator 100 from FIG. 1 with the first panel 147 removed according to an aspect of the invention. As shown, the solar electric generator 100 includes at least one air intake 145 that allows air to enter the first section 105 housing 101. Also, as shown, the solar electric generator 100 includes a threaded electrical input connector 113, at least one electrical output connector 115, a power button 131, an adjustor 117, a power button 133 for the cooling fan 141, an indicator light 139, a positive electric terminal 119, a negative electric terminal 121, at least one input electrical gauge 123, and at least one output electrical gauge 125 coupled to the first section 105 of the housing 101. The solar electric generator 100 includes at least one electrical controller 143 and a cooling fan 141 disposed within the first section 105 of the housing 101.

As depicted, the adjustor 117 is in electrical communication with the at least one electrical controller 143. The threaded electrical input connector 113 is in electrical communication with the at least one electrical controller 143. The at least one electrical controller 143 is in electrical communication with the at least one rechargeable battery 139. The positive electric terminal 119 and the negative electric terminal 121 are in electrical communication with the at least one rechargeable battery 139. The at least one electrical output connector 115 is in electrical communication with the at least one electrical controller 143.

The components of the solar electric generator 100, as shown in FIG. 8, may be selected based on their inherent low temperature of operation. This may assist in ensuring that the solar electric generator 100 does not overheat, thus increasing the life expectancy of the various components of the solar electric generator 100 and the solar electric generator 100 as a whole.

Figure 9:
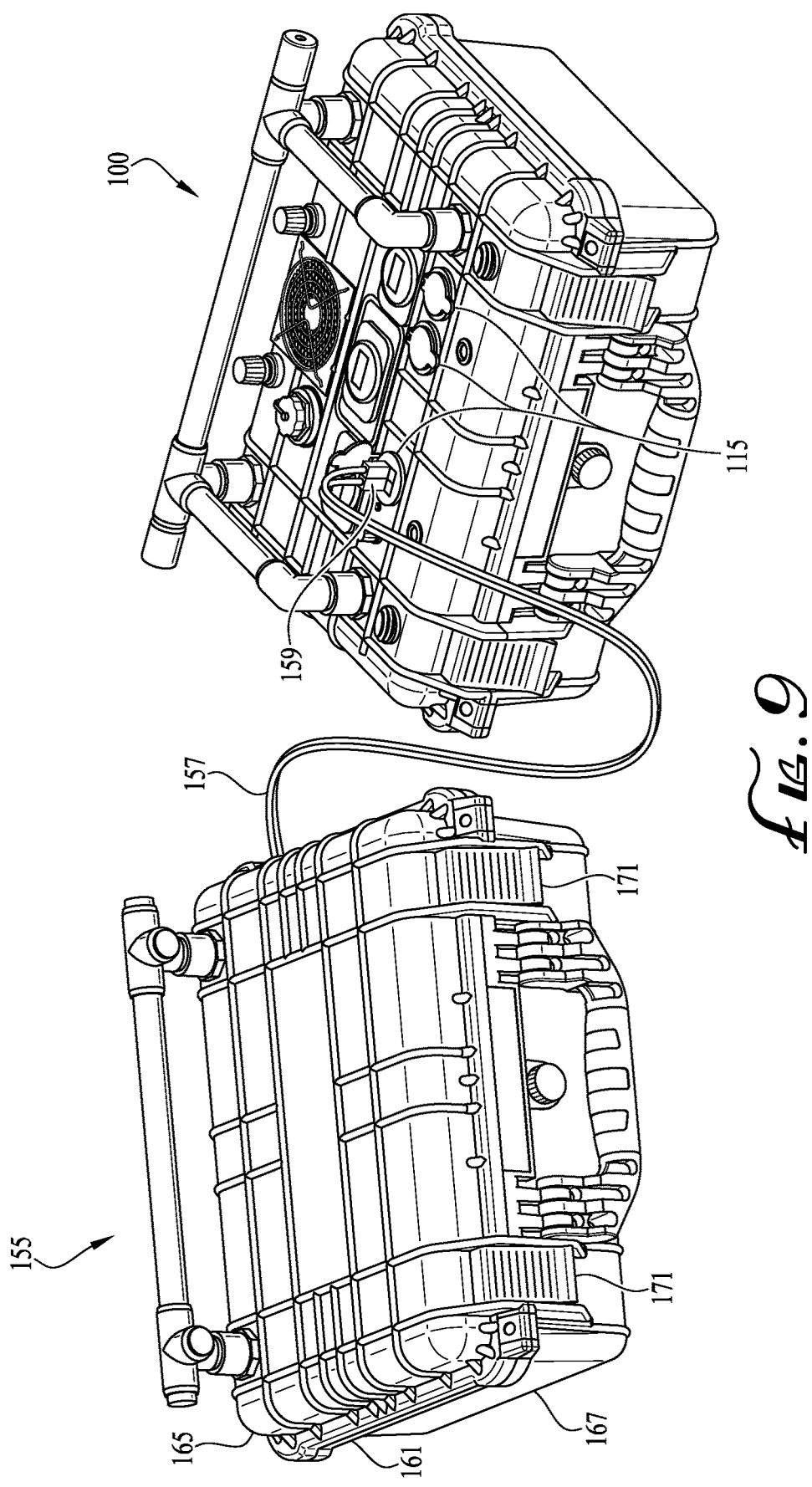
FIG. 9 shows a perspective view of the solar electric generator from FIG. 1 coupled to an external cooling fan according to an aspect of the invention.

FIG. 9 shows a perspective view of the solar electric generator 100 from FIG. 1 coupled to an external cooling fan 155 according to an aspect of the invention. The external cooling fan 155 includes an electrical power transmission line 157 with an electrical input connector 159 that is removeably coupled to the at least one electrical output connector 115 of the solar electric generator 100. The electrical power transmission line 157 may include an integrated circuit breaker. In some embodiments, the integrated circuit breaker may be electrically coupled between two electrical power transmission lines. For example, the external cooling fan 155 may be coupled to a first electrical power transmission line, the first electrical power transmission line may be coupled an integrated circuit breaker which is also coupled to a second electrical power transmission line having an electrical input connector 159.

The external cooling fan 155 includes a housing 161. The housing 161 has a top surface, a bottom surface opposite the top surface, and a plurality of side surfaces extending between the top surface and the bottom surface. The housing 161 includes at least one vent 163 (shown in FIG. 11) that allows air to exit from inside of the housing 161. The housing 161 includes a first section 165 and a second section 167 coupled to the first section 165. As depicted in FIG. 9, the top surface of the housing 161 is located on the first section 165 of the housing 161. The bottom and the plurality of side surfaces of the housing 161 are located on the second section 167 of the housing 161. The first section 165 and the second section 167 are coupled together via the one or more hinges 169 (shown in FIG. 10) to allow a user to open up and access the inside of the housing 161 by unlocking one or more latches 171.

The one or more hinges 169 are on the opposite side of the housing 161 from the one or more latches 171. In some embodiments, the one or more hinges 169 may be substituted by additional one or more latches that allow the first section 165 to be removably coupled from the second section 167. The one or more latches 171 may be replaced by other forms of locking interchangeably according to various embodiments. For example, the one or more latches 171 may be replaced by one or more magnetic closure devices.

The housing 161 is depicted as being rectangular in shape. However, other shapes may be used interchangeably according to various embodiments. For example, the housing 161 may be square or circular in shape. The housing 161 may be constructed from a high impact plastic. In some embodiments, the housing 161 may be constructed from metal. For example, the housing 161 may be constructed from aluminum.

Figure 10:
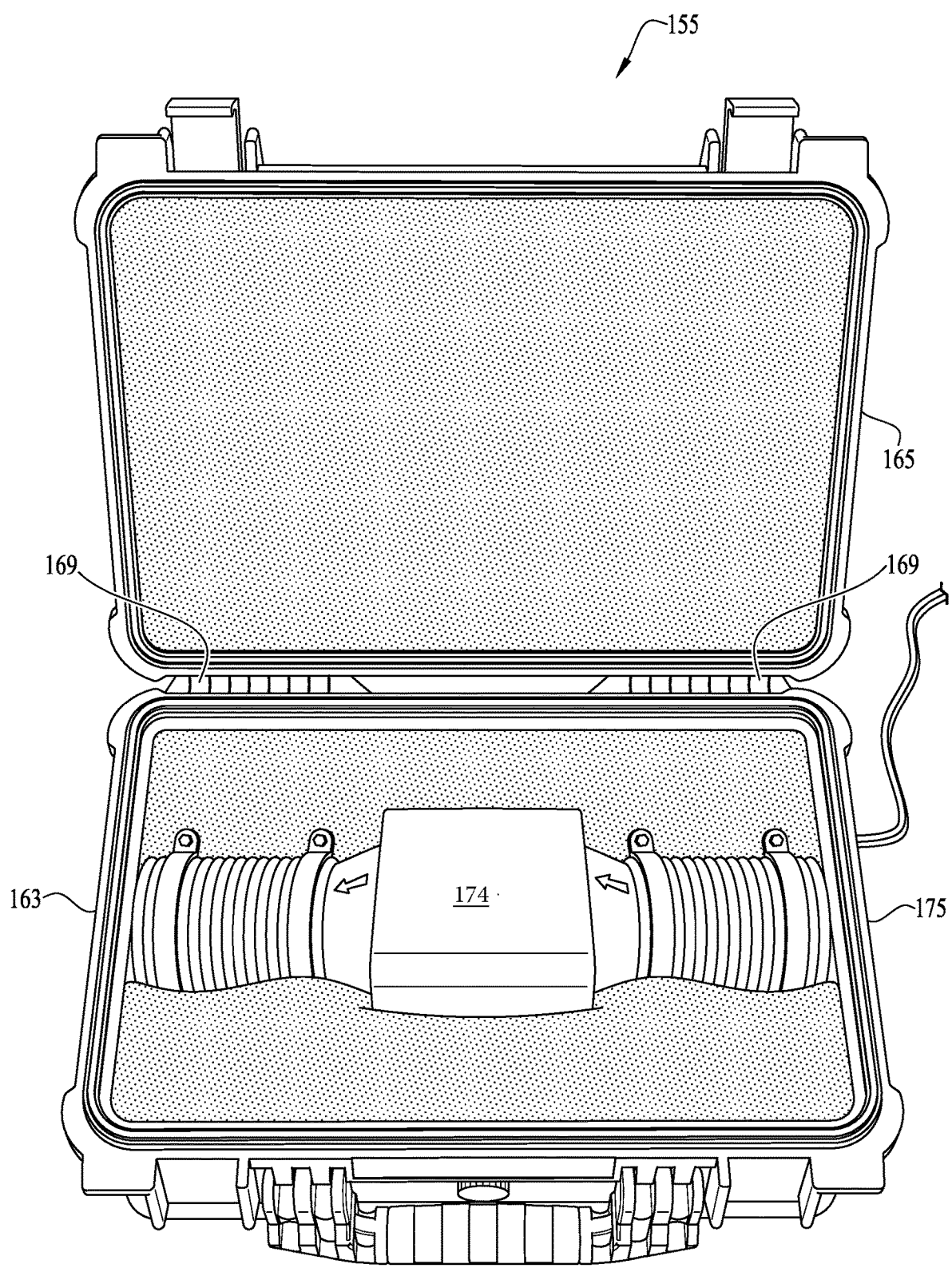
FIG. 10 shows an internal view of the external cooling fan from FIG. 9 according to an aspect of the invention.

FIG. 10 shows an internal view of the external cooling fan 155 from FIG. 9 according to an aspect of the invention. As shown, the external cooling fan 155 includes a blower 174 located in the second section 167 of the housing 161. The housing 161 includes at least one vent that 163 that allows air to exit from inside of the housing 161. The housing 161 includes at least one intake 175 that allows air to enter inside of the housing 161.

Figure 11:
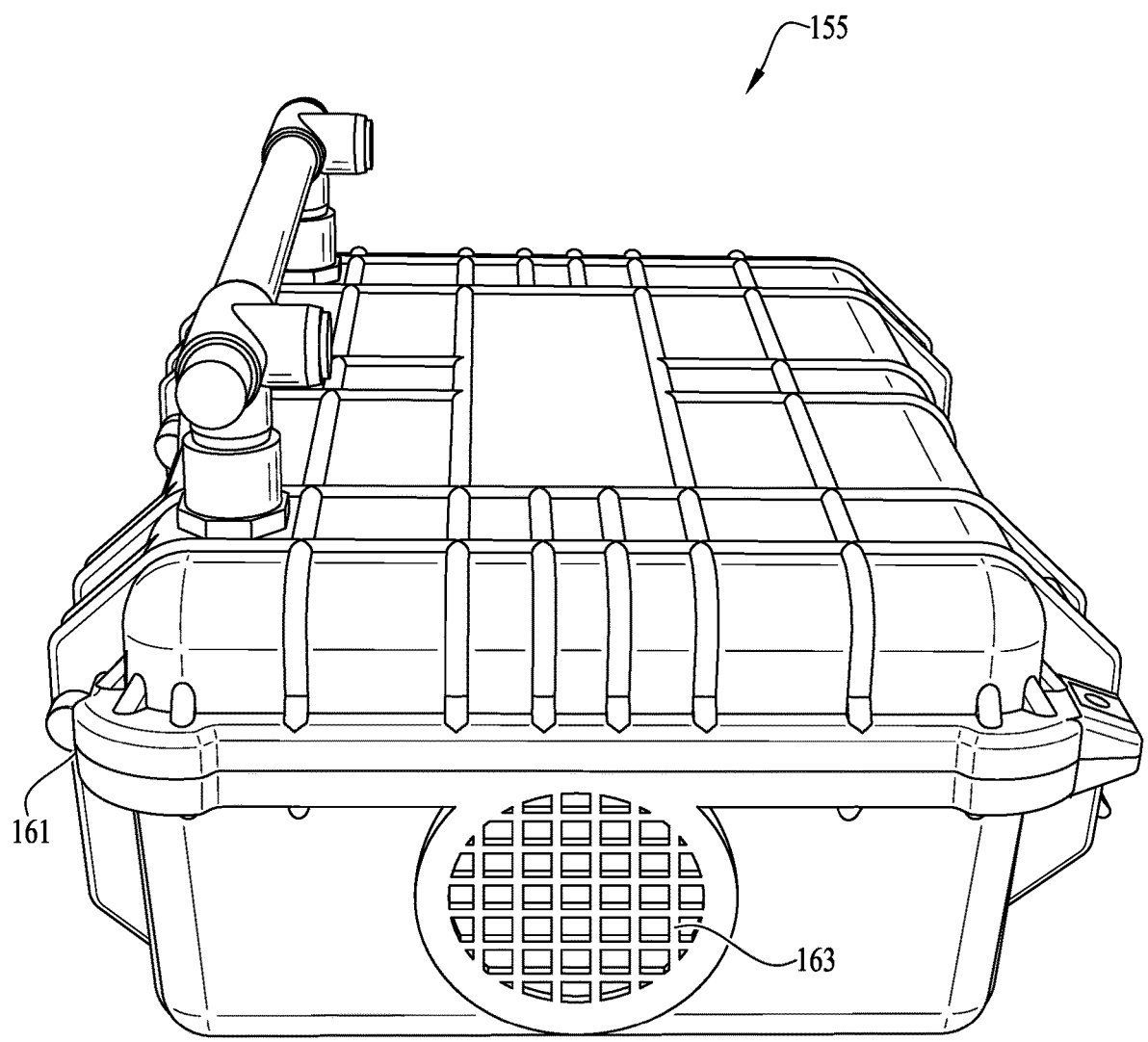
FIG. 11 shows a side view of the external cooling fan from FIG. 9 according to an aspect of the invention.

FIG. 11 shows a side view of the external cooling fan 155 from FIG. 9 according to an aspect of the invention. As shown, the housing 161 includes at least one vent 163 that allows air to exit from inside of the housing 161.

In closing, it is to be understood that although aspects of the present specification are highlighted by referring to specific embodiments, one skilled in the art will readily appreciate that these disclosed embodiments are only illustrative of the principles of the subject matter disclosed herein. Therefore, it should be understood that the disclosed subject matter is in no way limited to a particular methodology, protocol, and/or reagent, etc., described herein. As such, various modifications or changes to or alternative configurations of the disclosed subject matter can be made in accordance with the teachings herein without departing from the spirit of the present specification. Lastly, the terminology used herein is for the purpose of describing particular embodiments only, and is not intended to limit the scope of systems, apparatuses, and methods disclosed herein, which is defined solely by the claims. Accordingly, the systems, apparatuses, and methods are not limited to that precisely as shown and described.

Certain embodiments of systems, apparatuses, and methods are described herein, including the best mode known to the inventors for carrying out the same. Of course, variations of these described embodiment swill become apparent to those of ordinary skill in the art upon reading the foregoing description. The inventor expects skilled artisans to employ such variations as appropriate, and the inventors intend for the systems, apparatuses, and methods to be practiced otherwise than specifically described herein. Accordingly, the systems, apparatuses, and methods include all modifications and equivalents of the subject matter recited in the claims appended hereto as permitted by applicable law. Moreover, any combination of the above-described embodiments in all possible variations thereof is encompassed by the systems, apparatuses, and methods unless otherwise indicated herein or otherwise clearly contradicted by context.

Groupings of alternative embodiments, elements, or steps of the systems, apparatuses, and methods are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses an approximation that may vary, yet is capable of performing the desired operation or process discussed herein.

The terms "a," "an," "the" and similar referents used in the context of describing the systems, apparatuses, and methods (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the systems, apparatuses, and methods and does not pose a limitation on the scope of the systems, apparatuses, and methods otherwise claimed. No language in the present specification should be construed as indicating any non-claimed element essential to the practice of the systems, apparatuses, and methods.

All patents, patent publications, and other publications referenced and identified in the present specification are individually and expressly incorporated herein by reference in their entirety for the purpose of describing and disclosing, for example, the compositions and methodologies described in such publications that might be used in connection with the systems apparatuses, and methods. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

What is claimed is:

1. A solar powered electric generator comprising:
   a housing having at least one vent configured to allow air to exit from inside of the housing and at least one air intake configured to allow air to enter the housing;
   a cooling fan disposed within the housing and configured to blow air out of the at least one vent;
   a threaded electrical input connector coupled to the housing and configured to receive electrical energy from a solar panel array;
   at least one rechargeable battery disposed within the housing;
   at least one electrical output connector coupled to the housing;
   at least one electrical controller disposed within the housing and configured to distribute electrical power received from the threaded electrical input connector to the at least one rechargeable battery and the at least one electrical output connector; and
   an adjustor coupled to the housing and in electrical communication with the at least one electrical controller, the adjuster being configured to allow a user to adjust the output electrical energy to the at least one electrical output connector;
   one or more carrying handles coupled the housing, wherein the one or more carrying handles further include one or more air inlet apertures in fluidic communication with the at least one air intake.

2. The solar powered electric generator of claim 1, wherein the at least one electrical output connector comprises at least one of a 12-volt electrical connector, a USB connector, an Anderson Powerpole connector, or a JST connector.

3. The solar powered electric generator of claim 2, further comprising:
   a positive electrical terminal coupled to the housing and in electrical communication with the at least one rechargeable battery; and
   a negative electrical terminal coupled to the housing and in electrical communication with the at least one rechargeable battery.

4. The solar powered electric generator of claim 3, further comprising:
   at least one input electrical gauge coupled to the housing and comprising at least one of a voltmeter or an ammeter; and
   at least one output electrical gauge coupled to the housing and comprising at least one of a voltmeter or an ammeter.

5. The solar powered electric generator of claim 4, wherein the adjustor is a potentiometer.

6. The solar powered electric generator of claim 1, further comprising a wireless access device in electrical communication with the at least one electrical controller and configured to communicate with and receive commands from a mobile device.

7. The solar powered electric generator of claim 6, wherein the mobile device is at least one of a remote control, a smartphone, or a tablet.

8. A solar powered electric generator system comprising:
   a solar panel array having an electrical power transmission line with a threaded electrical output connector, the solar panel array being configured to generate electrical energy; and
   a solar powered electric generator comprising:
      a housing having at least one vent configured to allow air to exit from inside of the housing and at least one air intake configured to allow air to enter the housing,
      a cooling fan disposed within the housing and configured to blow air out of the at least one vent,
      a threaded electrical input connector coupled to housing and configured to removably couple to the threaded electrical output connector and receive the electrical energy from the solar panel array,
      at least one rechargeable battery disposed within the housing,
      at least one electrical output connector coupled to housing,
      at least one electrical controller disposed within the housing and configured to distribute electrical power received from the threaded electrical input connector to the at least one rechargeable battery and the at least one electrical output connector, and an adjustor coupled to the housing and in electrical communication with the at least one electrical controller, the adjuster being configured to allow a user to adjust the output electrical energy to the at least one electrical output connector;

one or more carrying handles coupled the housing, wherein the one or more carrying handles further include one or more air inlet apertures in fluidic communication with the at least one air intake.

9. The solar powered electric generator system of claim 8, wherein the at least one electrical output connector comprises at least one of a 12-volt electrical connector, a USB connector, an Anderson Powerpole connector, or a JST connector.

10. The solar powered electric generator system of claim 9, wherein the solar powered electric generator further comprises:

a positive electrical terminal coupled to the housing and in electrical communication with the at least one rechargeable battery; and a negative electrical terminal coupled to the housing and in electrical communication with the at least one rechargeable battery.

11. The solar powered electric generator system of claim 10, wherein the solar powered electric generator further comprises:

at least one input electrical gauge coupled to the housing and comprising at least one of a voltmeter or an ammeter; and at least one output electrical gauge coupled to the housing and comprising at least one of a voltmeter or an ammeter.

12. The solar powered electric generator system of claim 11, wherein the adjustor is a potentiometer.

13. The solar powered electric generator system of claim 8, wherein the solar powered electric generator further comprises a wireless access device in electrical communication with the at least one electrical controller and configured to communicate with and receive commands from a mobile device.

14. The solar powered electric generator system of claim 13, wherein the mobile device is at least one of a remote control, a smartphone, or a tablet.

15. The solar powered electric generator system of claim 8, further comprising an external cooling fan having an electrical input connector removably coupled to the at least one electrical output connector.

16. The solar powered electric generator system of claim 8, wherein the electrical power transmission line of the solar panel array further includes an integrated circuit breaker.

* * * * *